United States Patent [19]

Kitamoto et al.

[11] 3,844,907

[45] Oct. 29, 1974

[54] METHOD OF REPRODUCING MAGNETIZATION PATTERN

[75] Inventors: Tatsuji Kitamoto; Masashi Aonuma; Kazuhiro Kawaziri, all of Odawara, Japan

[73] Assignee: Fuji Photo Film Co., Ltd., Kanagawa, Japan

[22] Filed: Aug. 17, 1973

[21] Appl. No.: 389,085

Related U.S. Application Data

[63] Continuation-in-part of Ser. No. 129,131, March 29, 1971, Pat. No. 3,759,796.

[30] Foreign Application Priority Data

Mar. 27, 1970 Japan .............................. 45-25712

[52] U.S. Cl. ............ 204/12, 117/240, 179/100.2 E, 346/74 MP

[51] Int. Cl. ...... C04b 35/00, C23b 7/02, G11b 5/00

[58] Field of Search ...................... 204/12; 117/240; 179/100.2 E; 346/74 MP

[56] References Cited

UNITED STATES PATENTS

| | | | |
|---|---|---|---|
| 2,165,027 | 7/1939 | Bitter | 204/12 |
| 2,657,932 | 11/1953 | Blaney | 179/100.2 E |
| 2,686,229 | 8/1954 | Blancy | 179/100.2 E |
| 2,792,340 | 5/1957 | James | 204/13 |
| 2,927,889 | 3/1960 | Clinehens | 204/13 |
| 2,943,908 | 7/1960 | Hanna | 346/74 MP |
| 3,441,494 | 4/1969 | Oshima et al. | 204/28 |
| 3,523,824 | 8/1970 | Powers et al. | 117/240 |
| 3,556,954 | 1/1971 | Luborsky | 204/28 |
| 3,564,156 | 2/1971 | Griener | 179/100.2 E |

*Primary Examiner*—T. M. Tufariello
*Attorney, Agent, or Firm*—Sughrue, Rothwell, Mion, Zinn & Macpeak

[57] ABSTRACT

Reproduction of an original magnetization pattern by forming a magnetic film having a high magnetization resistance on a substrate tape having a magnetization pattern thereby to magnetize said film in the same pattern as that of the substrate, and stripping off said magnetic film from the substrate. The magnetic film is formed by plating or vapor deposition and can be used repeatedly as a master tape to reproduce large quantities of the magnetization pattern by such means as magnetic transfer.

10 Claims, No Drawings

METHOD OF REPRODUCING MAGNETIZATION PATTERN

CROSS-REFERENCE TO RELATED APPLICATIONS

This application is a continuation-in-part application of copending application, Ser. No. 129,131, filed Mar. 29, 1971 now U.S. Pat. No. 3,759,796.

BACKGROUND OF THE INVENTION

1. Filed of the Invention

This invention relates to a method of reproducing a magnetization pattern which comprises forming a magnetic layer with a magnetization pattern corresponding to an information signal, and reproducing therefrom a new magnetic recording layer having said pattern.

One example of the utility which the present invention finds is in the manufacture of a master for reproduction of a pattern of a magnetically recorded signal.

2. Description of the Prior Art

In the production of large quantities of recorded videotapes by reproducing a video signal recorded on original videotape, it is impossible to raise the relative speed between the tape and the head much higher than that during playback since the playback speed itself is very high. The economical methods of producing recorded videotapes which have been proposed previously include a method wherein the output signal of a playback video tape recorder (VTR) is divided among a plurality of recording video tape recorders to effect reproduction simultaneously; a method wherein a master tape and a slave tape are caused to run in intimate contact with each other and a high frequency magnetic field is applied thereto to effect transfer; or a method wherein a master tape and a slave tape are superposed and wound up, and a magnetic transfer field or heat is applied thereto to effect transfer.

The first of these methods is reliable, but is not suitable for making large quantities of copy because of the limitation on the number of reproducing VTRs that can be used at a time. The second and third methods involve magnetic transfer by applying a magnetic field or heat to a master tape and a slave tape superposed in face-to-face contact, and are superior in that the speed of reproduction can be chosen irrespective of the density of recording. The master to be used in this type of method is desirably one which has sufficiently high coercivity and is stable to a magnetic field or heat to be applied at the time of transfer. If, however, the master tape has too high a coercivity, it becomes difficult to record the original signal on it.

SUMMARY OF THE INVENTION

The present invention provides a method of reproducing an original magnetization pattern which comprises forming a magnetic film on a substrate having a magnetization pattern thereby to magnetize said film in the same pattern as that of the substrate, and stripping off the resulting magnetic film having said magnetization pattern.

According to the method of the present invention, a magnetic layer having the desired high coercivity and simultaneously having a magnetization pattern to be used as a master can be produced with ease. The invention also makes it possible to reproduce a magnetically recorded pattern on a recording medium, in the form of a metal film of high refractive index suited for reading the pattern optically, thereby to form a magnetic layer in which the magnetically recorded pattern can be read by means other than a magnetic head.

Other various applications of the method of the present invention will be understood from the following description.

DESCRIPTION OF THE PREFERRED EMBODIMENTS

In the method of the present invention, an information signal is magnetically recorded as a magnetization pattern on a suitable magnetic recording medium such as magnetic tape, and a magnetic layer is gradually formed thereon by a suitable procedure such as non-electrolytic plating (chemical plating), electric plating or vacuum evaporation. In the case of non-electrolytic cobalt plating for example, cobalt ions diffuse from a liquid, and are reduced basically at those points where an activator adhers, thereby to form entangled acicular crystals consisting of cobalt metal. We have found that if the substrate used at this time is a magnetized one, a ferromagnetic precipitated film is magnetized in the same direction and has the same magnetization pattern as that of the substrate.

By this method, it is also possible to reproduce a magnetization pattern on a film having a very high coercivity, for example 1,300 Oe, which is difficult to magnetize by a customary method. For example, after a film of sufficient thickness having a reproduced magnetic pattern has been formed in this way on the substrate having the original magnetization pattern, a support film having applied thereto an adhesive layer is stuck thereto, and the film having the reproduced magnetization pattern in then stripped off. Thus, a new magnetic layer with a reproduced magnetization pattern can be obtained.

In the case of rapidly producing large quantities of recorded videotapes by reproducing a magnetic signal recorded on a magnetic tape such as videotape, there has been proposed a method of bringing a master tape and a slave tape into intimate contact with each other and applying a high frequency magnetic field or heating the assembly up to the Curie point of the magnetic tape. The latter method is practically applied only to a $CrO_2$ tape having a comparatively low Curie point, while the former is mainly applied to a magnetic tape of $\gamma$—$Fe_2O_3$.

As a master tape for use in anhysteretic contact duplication by applying high frequency magnetic field, those having enough coercivity to be stable to the magnetic field or the heat to be applied thereto upon duplication are desirable, and $\gamma$—$Fe_2O_3$ tapes doped with Co are in wide use. The optimal coercivity of a master tape for use in duplication is believed to be 1.5 – 3.0 times that of a slave tape. However, if the coercivity is too high, it becomes difficult to record the original signal on it, and a special apparatus is required for recording on a high coercivity master tape a mirror image, i.e., magnetic signal which is in mirror image relation to the magnetic signal to be duplicated.

In recent years, $\gamma$—$Fe_2O_3$ magnetic tapes having a coercivity of above 300 Oe, greater than that of conventional tapes, have been developed for satisfying the requirement of recording with high density. Thus, $\gamma$—$Fe_2O_3$ tapes having a coercivity as high as 450 Oe are coming into general use.

In conducting duplication on $\gamma-Fe_2O_3$ magnetic tapes having such a high coercivity, conventional master tapes are accompanied by difficulties for the above-described reason. According to the present invention, however, a magnetic layer having the desired high coercivity and, at the same time, having a magnetic signal suitable for a master, can be prepared. Thus, master tapes can be produced from $\gamma-Fe_2O_3$ tapes having a coercivity greater than that of the conventional tapes, which enable the production in large quantities of $\gamma-Fe_2O_3$ tapes having magnetic signals duplicated from a master magnetic signal.

The following examples will more specifically illustrate the present invention, without limiting the same.

EXAMPLE 1

A dispersion, prepared by dispersing a $\gamma-Fe_2O_3$ magnetic powder having a coercivity of 480 Oe in an organic binder, was applied to a polyethylene terephthalate base (hereinafter referred to as "PET base") of a thickness of 25 $\mu$. The thus coated base was slit to a width of ½ inch to prepare video tapes for home use. The coercivity and the squareness ratio of the video tapes were 430 Oe and 0.72, respectively.

On one of the resulting magnetic tapes was recorded a gray scale video signal by means of a VTR (video tape recorder) for home use. Thereafter, a Co—P magnetic film was formed on the magnetic layer with the recorded signal by chemical plating in the following manner.

1. The surface of the magnetic layer of this tape was immersed in a neutral defatting agent.
2. Subsequently, the surface of the magnetic layer was immersed in a solution of benzotriazole.
3. It was immersed in a hydrochloric acid solution of stannous chloride.
4. It was then immersed in a dilute hydrochloric acid solution of palladium chloride.
5. The surface of the magnetic layer so treated was chemically plated from a bath of the following formulation under the following conditions.

| | |
|---|---|
| $CoSo_4.7H_2O$ | 7 g/liter |
| $Na_2C_4H_4O_6.2H_2O$ | 57.5 g/liter |
| $H_3BO_3$ | 15.5 g/liter |
| $NaH_2PO_2.H_2O$ | 10.6 g/liter |
| pH: | 9.0 (adjusted with a solution of sodium hydroxide) |
| Temperature: | 80°C |

This chemical plating was conducted for 20 minutes to form a magnetic plated layer of 0.35 $\mu$ in thichness of a coercivity of 1,050 Oe and having a squareness ratio of 0.75. A nitrile rubber type binding agent was coated on the magnetic plated layer so obtained. A 25 $\mu$ thick PET base was pressed onto the magnetic plated layer, then the magnetic plated layer was separated from the $\gamma-Fe_2O_3$ magnetic layer to thereby prepare a magnetic plated tape. It was found that the same gray scale video signal as in the original tape ($\gamma-Fe_2O_3$-coated tape) was recorded on the magnetic plated tape.

The above-described magnetic plated tape and another $\gamma-Fe_2O_3$-coated video tape, having been previously prepared, designed for use in a home VTR were wound simultaneously on a reel with both magnetic layers being in intimate face-to-face contact with each other, and a transfer magnetic field of about 700 Oe applied to the tapes in this state.

When the transfer $\gamma-Fe_2O_3$-coated video tape was played back, the output of the original gray scale video signal was obtained.

The signal recorded on the magnetic plated layer was not erased by the application of a trasfer magnetic field of 700 Oe, and could be repeatedly used as a master tape.

EXAMPLE 2

A gray scale video signal was recorded on a $\gamma-Fe_2O_3$-coated video tape of a coercivity of 360 Oe and a squareness ratio of 0.71, and a Co—P layer was formed in the same manner as in Example 1 by chemically plating on the magnetic layer of the tape having the recorded signal. This chemical plating was conducted for 30 minutes to obtain a magnetic plated layer with a thickness of 0.50 $\mu$, a coercivity of 800 Oe and a squareness ratio of 0.75. It was found that the same magnetization pattern as that on the original tape ($\gamma-Fe_2O_3$-coated type) was recorded on the thus formed magnetic plated layer.

A transfer $\gamma-Fe_2O_3$-coated magnetic tape (coercivity: 295 Oe; squareness ratio: 0.70) and the original tape having the magnetic plated layer formed thereon were simultaneously wound on a reel with both magnetic layers being in intimate contact with each other, and a transfer magnetic field of about 500 Oe was applied to the tapes in this state to transfer the magnetization pattern.

When the transfer tape was played back, the output of the original video signal could be obtained. The original tape having formed thereon the magnetic plated layer could be repeatedly used as a master tape.

Example 3

A magnetization pattern was recorded on a magnetic sheet (coercivity: 370 Oe; squareness ratio: 0.76) by means of a VSR (video sheet recorder), the magnetic sheet being obtained by chemically plating a Co—P magnetic layer on a PET base. Furthermore, a Co—Ni magnetic film was formed on the magnetic sheet by electroplating under the following conditions.

| | |
|---|---|
| $NiSO_4 \cdot 6H_2O$ | 26.4 g/liter |
| $CoSO_4 \cdot 7H_2O$ | 28.2 g/liter |
| $NH_4Cl$ | 27 g/liter |
| $NaH_2PO_2 \cdot H_2O$ | 4.2 g/liter |
| pH: 4.2 | |
| Temperature: 50°C | |
| Electric current density: | 1.0 A/dm² |

An electroplated layer of a thickness of 0.5 $\mu$, a coercivity of 850 Oe and a squareness ratio of 0.75 was formed by electroplating for 4.5 minutes. The original signal recorded previously on the chemical plated layer was directly re-recorded on the electroplated layer.

This magnetic recording sheet was brought into intimate contact with a separately prepared transfer magnetic sheet (coercivity: 370 Oe; squareness ratio: 0.76) with the magnetic layers facing each other, and a transfer magnetic field of 600 Oe was applied thereto to transfer the magnetization pattern. When the transfer magnetic sheet was played back using a VSR, the output of the original signal could be obtained.

COMPARATIVE EXAMPLE 1

A tape designed for use in a home video tape recorder was used. This tape was prepared by coating $\gamma$—$Fe_2O_3$ on a polyethylene terephthalate tape of a thickness of about 25 $\mu$, and slitting to a width of ½ inch and had recorded thereon a gray scale video signal. The surface of the magnetic layer of this tape was immersed in a neutral defatting agent (for example, SUPER-COATER, produced by NIHON HYURUDO KAGAKU) and then in a solution of benzotriazole. It was further immersed in a dilute hydrochloric acid solution of stannous chloride, and a dilute hydrochloric acid solution of palladium chloride. The surface of the magnetic layer so treated was chemically plated from a bath of the following formulation at 80°C. for 30 minutes at a pH of 9.0 (adjusted with a sodium hydroxide solution).

Formulation of the Bath

| | |
|---|---|
| $CoSO_4 \cdot 7H_2O$ | 7 g/liter |
| $Na_2C_4H_4O_6 \cdot 2H_2O$ | 57.5 g/liter |
| $H_3BO_3$ | 15.5 g/liter |
| $NaH_2PO_2 \cdot H_2O$ | 10.6 g/liter |

A nitrile rubber type binding agent was coated on the magnetic plated layer so obtained. A 25 $\mu$ thick polyethylene terephthalate film was bonded on a magnetic plated layer, and the magnetic plated layer was separated from the $\gamma$—$Fe_2O_3$ magnetic layer. Thus, a magnetic plated tape consisting of the polyethylene terephthalate film and the magnetic plated layer was obtained.

The plated layer was a Co—P alloy layer with a thickness of 0.6 $\mu$. The magnetic plated tape had magnetic characteristics expressed by a coercivity of 800 Oe and a squareness ratio (Br/Bm) of 0.75. It was found that the same gray scale video signal as in the $\gamma$—$Fe_2O_3$-coated tape was recorded on the magnetic plated surface of the resulting tape.

The plated tape and another ordinary $\gamma$—$Fe_2O_3$-coated tape designed for use in a home VTR were wound simultaneously on a reel with both magnetic layers being in intimate contact with each other, and a transfer magnetic field of about 500 Oe was applied to the tapes in this state to transfer the video signal.

When the transfer tape was played back, the output signal of the original gray scale was obtained.

The signal recorded on the magnetic plated layer was not erased by the application of a transfer magnetic field of 500 Oe, and could be repeatedly used as a master tape.

COMPARATIVE EXAMPLE 2

A Co—P alloy layer having a magnetization pattern was formed by chemical plating under the same conditions as set forth in Example 1 on a polyethylene terephthalate film having a width of ½ inch and a thickness of about 25 $\mu$ and coated with $\gamma$—$Fe_2O_3$. The magnetic plated layer had a thickness of 0.5 $\mu$ and magnetic characteristics expressed by an Hc of 800 Oe and a squareness ratio (Br/Bm) of 0.75.

A transfer tape (an ordinary videotape coated with $\gamma$—$Fe_2O_3$ designed for use in a home VTR) and the original tape having formed thereon the magnetic plated layer were wound up on a reel with both magnetic layers being in intimate contact with cash other, and a transfer magnetic field of about 500 Oe was applied to the tapes in this state to transfer the magnetization pattern. When the transfer tape was played back, the output of the original video signal could be obtained. The original tape having formed thereon the magnetic plated layer could be repeatedly used as a master tape.

COMPARATIVE EXAMPLE 3

A gray scale video signal was recorded as in Comparative Example 1 on a magnetic disc produced by chemically plating a Co—P alloy layer on a 25 $\mu$ thick polyethylene terephthalate film base. The alloy layer had an Hc of 280 Oe and a squareness ratio (Br/Bm) of 0.78. The magnetic disc was further electrically plated from a bath of the following formulation at 50° C. for 5 minutes at a pH and a current density maintained at 4.2 and 1 A/dm², respectively.

Formulation of the Bath

| | | |
|---|---|---|
| $NiSO_4.6H_2O$ | 26.4 | g/liter |
| $CoSO_4.7H_2O$ | 28.2 | do. |
| $NH_4Cl$ | 27 | do. |
| $NaH_2PO_2.H_2O$ | 4.2 | do. |

The electroplated coating had a thickness of 0.6 $\mu$, an Hc of 800 Oe and a squareness ratio (Br/Bm) of 0.78. The original signal recorded previously on the chemical plated layer was directly re-recorded on the electroplated layer.

The magnetic disc was brought into intimate contact with the magnetic layer of a transfer magnetic disc, and a transfer magnetic field of 500 Oe was applied thereto. When the transfer magnetic disc was played back, the output of the original signal could be obtained. This Comparative example demonstrates that a master having a relatively small coercivity and having susceptibility to magnetic erosion in a transfer magnetic field can be reinforced to provide an excellent master.

As shown in the foregoing Comparative examples, according to the present invention, a substrate having a magnetic layer with a coercivity of 300 Oe or less is plated with a magnetic film having a high coercivity while the substrate has recorded thereon an information signal. This makes it possible to easily record a magnetization pattern corresponding to the signal on the magnetic film obtained by plating.

As is clear from Examples set forth above, especially with respect to the Comparative Examples given, even when a magnetic recording layer having a coercivity as high as 450 Oe, which in recent years have come into practical use, is used as a substrate, a magnetic signal pattern on the substrate can be duplicated according to the present invention on a magnetic layer formed thereon by plating. In this case, the coercivity of the magnetic layer formed by plating can be optionally selected.

As is clear in the above Examples, the magnetic signal pattern can be duplicated on a magnetic layer formed on a magnetic recording layer to be a substrate, the magnetic layer having a markedly higher coercivity than that of the magnetic recording layer. This is an important aspect of the present invention.

As a master tape for use in anhysteretic contact duplication by applying a high frequency magnetic field, a coercivity 1.5 – 3.0 times that of a slave tape is required. The present invention enable the preparation of such a master tape with ease.

While the examples have been given with regard to chemical plating and electroplating, it should be understood that a magnetic film having sufficient effects intended by the present invention can be produced by such procedures as vacuum evaporation and gaseous plating. For example, the reproduction of an original magnetization pattern can be obtained by thermally decomposing cobalt carbonate under controlled conditions of temperature and rate of flow.

While the invention has been described in detail and with reference to specific embodiments thereof, it will be apparent to one skilled in the art that various changes and modifications can be made therein without departing from the spirit and scope thereof.

What is claimed is:

1. A method for reproducing an original magnetization pattern of a substrate which has a low coercivity of not less than 300 Oe to form a master of high coercivity capable of repeated use, said high coercivity ranging from 1.5 to 3.0 times said low coercivity, said method comprising plating onto the low coercivity substrate a ferromagnetic material of high coercivity therby forming a plated magnetic film of said ferromagnetic material of high coercivity, said plated magnetic film having the same magnetization pattern as said original magnetization pattern.

2. A method according to claim 1, further comprising stripping said plated magnetic film from the substrate by bonding a support film to the plated magnetic film with an adhesive and stripping off the plated magnetic film to form an assembly comprising said support film and said plated magnetic film bonded thereto by said adhesive.

3. A method according to claim 1, wherein said plated magnetic film is formed by chemical plating.

4. A method according to claim 1, wherein said plated magnetic film is formed by electroplating.

5. A method according to claim 1, wherein the coercivity of said plated magnetic film is from 500 to 1,350 Oe.

6. A method according to claim 1, wherein said low coercivity range from 300 to 450 Oe.

7. A method of reproducing an original magnetization pattern of a first magnetic recording medium having a coercivity of from 300 to 450 Oe comprising:

a. forming a plated metallic magnetic film having a high coercivity on the magnetic recording surface of said first magnetic recording medium whereby said plated magnetic film is magnetized in a pattern corresponding to said original magnetization pattern, the high coercivity ranging from 1.5 to 3.0 times the low coercivity;

b. transferring the reproduced magnetization pattern of said plated magnetic film to a second magnetic recording medium by intimately contacting said plated magnetic film with the magnetic recording surface of said second magnetic recording medium while applying thereto a transfer magnetic field.

8. A method according to claim 7, further comprising stripping said plated metallic magnetic film from said first magnetic recording medium after step (a) and prior to step (b).

9. A method according to claim 8, wherein said stripping is accomplished by coating onto said plated magnetic film a support film having an adhesive coating and subsequently stripping off said support film whereby said plated metallic film adheres to said support film being stripped off.

10. A method according to claim 7, wherein the coercivity of said plated magnetic film is from 500 to 1,350 Oe.

* * * * *